(12) United States Patent
Ko

(10) Patent No.: US 8,430,576 B2
(45) Date of Patent: Apr. 30, 2013

(54) FIBER TERMINATION IN LIGHT PEAK LENSES

(75) Inventor: Jamyuen Ko, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 13/048,538

(22) Filed: Mar. 15, 2011

(65) Prior Publication Data

US 2012/0237170 A1 Sep. 20, 2012

(51) Int. Cl.
*G02B 6/36* (2006.01)
*B21D 35/00* (2006.01)
*B23P 11/00* (2006.01)

(52) U.S. Cl.
USPC ............... 385/77; 385/76; 385/31; 385/33; 385/80; 385/52; 29/428; 29/469.5

(58) Field of Classification Search ............ 385/31, 385/32, 33, 34, 38, 52, 53, 56, 73, 74, 76, 385/77, 72, 78, 92, 93, 65, 80, 83
See application file for complete search history.

(56) References Cited

U.S. PATENT DOCUMENTS

| | | | |
|---|---|---|---|
| 5,394,498 A * | 2/1995 | Hinterlong et al. | 385/115 |
| 6,552,298 B1 * | 4/2003 | Wagner | 219/121.63 |
| 6,616,346 B1 * | 9/2003 | Brown et al. | 385/90 |
| 7,422,376 B2 * | 9/2008 | Chen et al. | 385/78 |
| 2003/0016935 A1 * | 1/2003 | Nakajima | 385/137 |
| 2003/0081397 A1 * | 5/2003 | Potter | 361/807 |
| 2003/0133687 A1 | 7/2003 | Han et al. | |
| 2010/0226611 A1 | 9/2010 | Goto et al. | |
| 2012/0237170 A1 * | 9/2012 | Ko | 385/77 |

FOREIGN PATENT DOCUMENTS

| | | |
|---|---|---|
| JP | 02123301 | 5/1990 |
| JP | 05088049 | 4/1993 |

OTHER PUBLICATIONS

"International Search Report and Written Opinion of the International Searching Authority for Application No. PCT/US2012/023936", (Jul. 27, 2012), Whole Document.

* cited by examiner

*Primary Examiner* — Brian Healy
(74) *Attorney, Agent, or Firm* — Blakely, Sokoloff, Taylor & Zafman LLP

(57) ABSTRACT

Embodiments of the invention describe optical cable housings including fiber termination units to couple optical fiber components to lenses. As in prior art solutions, embodiments of the invention utilize said fiber termination units to couple and optically align the optical fiber to the lenses; however, embodiments of the invention include flat-sided structures to more securely couple the optical fiber to the lenses; furthermore, said structures are more suitable for mass manufacturing compared to prior art solutions. Discussion herein of connectors and receptacles refers to providing a mechanical and communicative connection. The mating of the connector/receptacle may be facilitated via housing and alignment structural features, and typically includes contact of the electrical contacts and alignment of fiber optical signal transmission elements. The connection interface may further allow electrical and/or optical input/output (I/O) via the different interfaces incorporated within connector housing according to embodiments of the invention.

20 Claims, 4 Drawing Sheets

FIBER TERMINATION IN LIGHT PEAK LENSES

FIELD

Embodiments of the invention generally pertain to optical interconnects and more particularly to optical fiber housings.

BACKGROUND

As peripheral device speeds increase, copper wire cables struggle to keep up with the corresponding bandwidth demands. Current device communication specifications based on copper wire are updated by increasing the number of wires in interconnecting cables, restricting cable length, and adhering to strict signaling standards in order to keep pace with evolving peripheral devices.

The use of light transmissions as a communication medium and as an energy medium is increasing, and thus so has the use of optical fiber cable as a transmission medium to guide light transmissions. There are a number of advantages optical cables have over their copper counterparts. Optical fibers can transmit data at a higher rate, over longer distances and in a smaller volume compared to copper wires.

Current optical cable connector solutions, specifically optical fiber termination and lens coupling, consist solely of through-hole and refractive index-matching adhesive solutions. These solutions are not suitable for mass production or extended use. In particular, it is understood that through holes are relatively circular holes formed for an optical fiber to be "threaded" through; the circular shape of these holes means that there will be manufacturing inconsistencies (i.e., defects) that occur during mass production (e.g., abnormal curvatures preventing precise optical alignment). Therefore it is undesirable to rely solely on through holes to optically align optical fibers to lenses. What is needed is an optical fiber termination solution that reduces potential manufacturing issues, eases quality control concerns, and improves connector housing durability as optical cable use becomes more common.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe optical cable housings including fiber termination units to couple optical fibers components to lenses. As in prior art solutions, embodiments of the invention utilize said fiber termination units to couple and optically align the optical fiber to the lenses; however, embodiments of the invention include structures to more securely couple the optical fiber to the lenses; furthermore, said structures are more suitable for mass manufacturing compared to prior art solutions.

Discussion herein of connectors and receptacles refers to providing a mechanical and communicative connection. The mating of the connector/receptacle may be facilitated via housing and alignment structural features, and typically includes contact of the electrical contacts and alignment of optical fiber signal transmission elements. The connection interface may further allow either electrical input/output (I/O) or optical I/O or both via the different interfaces incorporated within connector housings according to embodiments of the invention.

The electrical protocols or standards that may be used by embodiments of the invention may include, but are not limited to, universal serial bus (USB, standard or mini, e.g. USB 3.0 Specification published Nov. 12, 2008), high-definition multimedia interface (HDMI, e.g. HDMI Specification Version 1.4a published Mar. 4, 2010), or DisplayPort (e.g., DisplayPort version 1.2 published Dec. 22, 2009). It is to be understood that each different standard may include a different configuration or pinout for the above described assemblies. Additionally, the size, shape and configuration of housings may be dependent on the standard, including tolerances for the mating of the corresponding connectors/receptacles. Thus, the layout of a connector that integrates optical I/O with electrical I/O may be different for the various standards. As will be understood by those of skill in the art, optical interfaces require line-of-sight connections to have an optical signal transmitter interface with a receiver (both may be referred to as lenses). Thus, the configuration of the connector will be such that the lenses are not obstructed by the corresponding electrical contact assemblies. For example, optical interface lenses can be positioned to the sides of the contact assemblies, or above or below, depending on where space is available within the connector housing.

Figure 1:
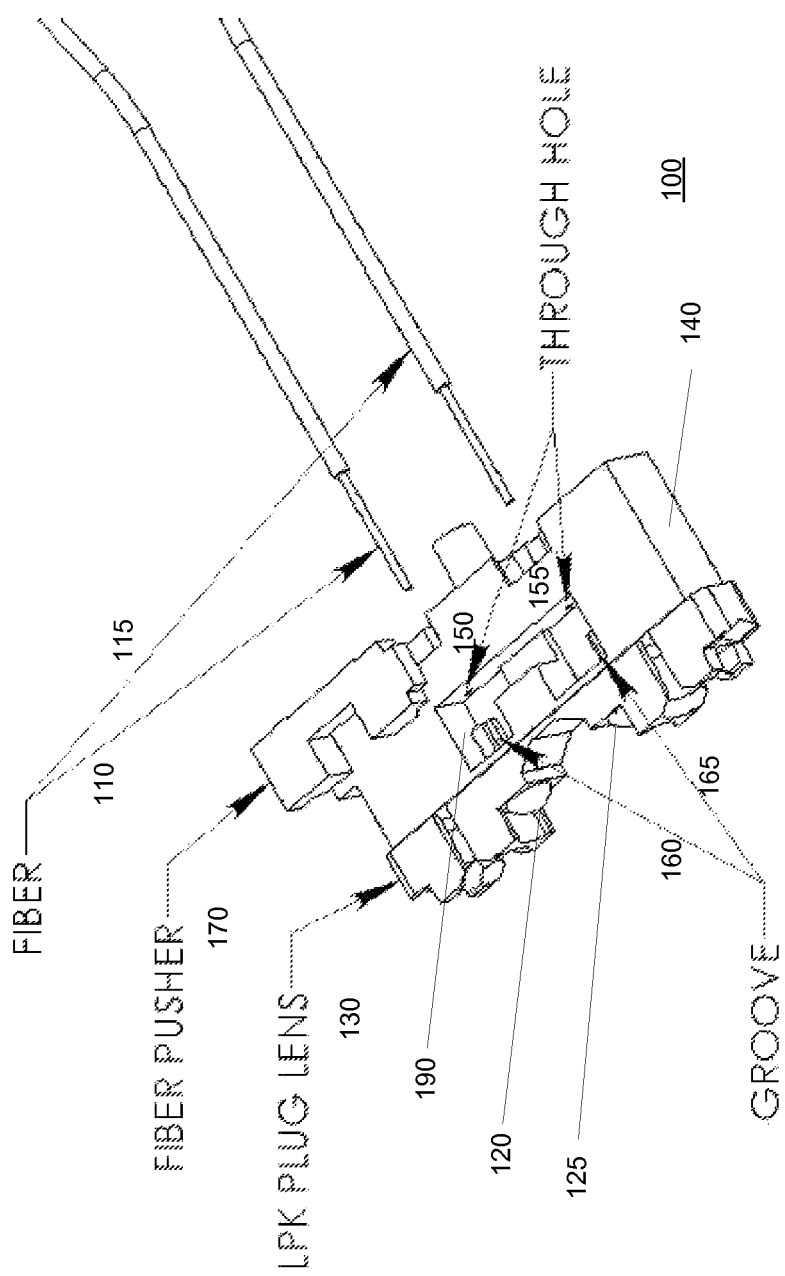
FIG. 1 is a block diagram of an embodiment of the invention.

FIG. 1 is a block diagram of an embodiment of the invention. Optical fiber cable unit 100 includes plug lens assembly 130, a connector housing to receive optical fiber cables 110 and 115, each of which comprise a cover sheath and a portion of exposed optical fiber terminated at the end of the cable (e.g., clean cleaved fiber). Plug lens assembly 130 may comprise any metal or plastic suitable for molding, and may be shaped in any manner corresponding to a receptacle to receive said assembly; for example, plug lens assembly may correspond to an I/O interface for computing devices and peripherals, and may conform to a variety of I/O protocols and standards for electrical and/or optical data transfer.

In this embodiment, plug lens assembly 130 includes fiber termination unit (i.e., fiber housing) 140 to couple fibers 110 and 115 to Light Peak (LPK) lenses 120 and 125, respectively. Said lenses may direct or re-direct light transmissions for a receptacle to receive plug lens assembly 130, and said lenses may comprise any appropriate material, including plastic, glass, silicon, or other materials that can be shaped and provide optical focusing.

In this embodiment, fiber termination unit 140 includes through holes 150 and 155. Fibers 110 and 115 are to be inserted into fiber termination unit 140 via these through holes. In the prior art, optical cable housings include through holes that extend through the entire housing up to the lens (or a stop surface to the lens). Thus, through holes are relied upon in the prior art to optically align the inserted optical fiber to the lens. It is understood that relying solely on through holes to optically align optical fiber to a lens is not an optimal solution for mass production; said through holes will not always be manufactured in a consistent, circular shape. Furthermore, insertion of fiber into the through hole may cause variations within the circular through hole that may lead to misalignment between the optical fiber and the lens (i.e., the optical axis of the fiber will not be aligned with the optical axis of the lens).

In contrast to the prior art, fiber termination unit 140 includes cavity 190 accessible by fibers 110 and 115 via through holes 150 and 155, respectively. Grooves 160 and 165 are further included in cavity 190; the grooves correspond to through holes 150 and 155, respectively, and are responsible for optically aligning said fibers to the lenses as described below.

Each of grooves 160 and 165 includes at least two flat sides, further described below. In contrast to the prior art, these flat sides are understood to be less prone to manufacturing defects compared to circular through holes, and are less prone to wearing variations from repeated insertion and/or removal of optical fiber. Thus, it is to be understood that relying upon grooves 160 and 165 to optical align optical fibers 110 and 115 to lenses 120 and 125, respectively, produces a solution more suitable for mass production and quality control.

In order to keep fibers 110 and 115 in place (i.e., optically aligned with their respective lenses), fiber pusher 170 may be utilized. Fiber pusher 170 is formed to at least partially fill cavity 190 and to "press down" on optical fibers 110 and 115 to the two flat sides of grooves 160 and 165, respectively. Fiber pusher 170 may include a flat surface to press down on each fiber, as described below. Thus, while fiber termination unit 140 includes through holes 150 and 155, they merely provide general alignment for the inserted optical fibers relative to the position of lenses 120 and 125; it is grooves 160 and 165, in combination with fiber pusher 170, which are designed to optically align the inserted optical fibers with lenses 120 and 125 and to securely hold said inserted optical fibers in place.

It is to be understood that while this embodiment is shown to include a single cavity housing two optical fibers, other embodiments may include individual cavities and fiber pushers for each optical fiber to be inserted into a fiber termination unit.

Figure 2:
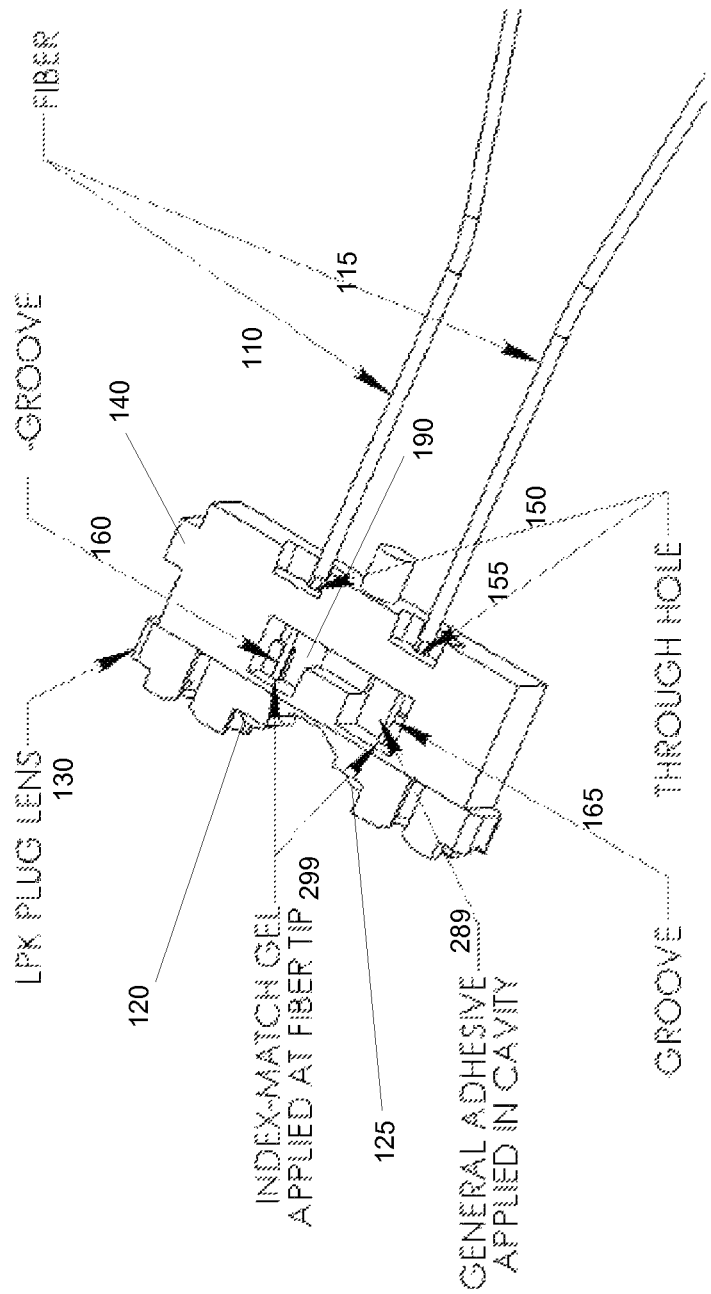
FIG. 2 is a block diagram of an embodiment of the invention.

FIG. 2 is a block diagram of an embodiment of the invention. In this embodiment, optical fibers 110 and 115 are shown to be inserted into cavity 190 via through holes 150 and 155, respectively. Fibers 110 and 115 are further placed on grooves 160 and 165, respectively, and will be optically aligned when a fiber pusher (not shown in this figure) is inserted into cavity 190.

In this embodiment, refractive index matching gel 299 may be applied at the tips of fibers 110 and 115. It is understood that the refractive index matching gel will help promote anti-reflection between the tips of fibers 110 and 115 and lenses 120 and 125, thereby eliminating or reducing optical loss between the fibers and the lenses. In one embodiment, refractive index matching gel 299 has a refractive index between 1.45 and 1.60.

It is to be understood that refractive index matching gel 299 does not contribute to the secure coupling of fibers 110 and 115 into fiber termination unit 140, nor does it contribute to the secure coupling of said fibers to lenses 120 and 125. Thus, in contrast to prior art solutions, refractive index matching gel 299 does not necessarily have to be an adhesive agent. In this embodiment, general adhesive 289 may be applied in cavity 190 to further help couple fibers 110 and 115 onto grooves 160 and 165, respectively, and help securely couple the fiber pusher to cavity 190. In other embodiments, general adhesive 289 is not used.

Figure 3:
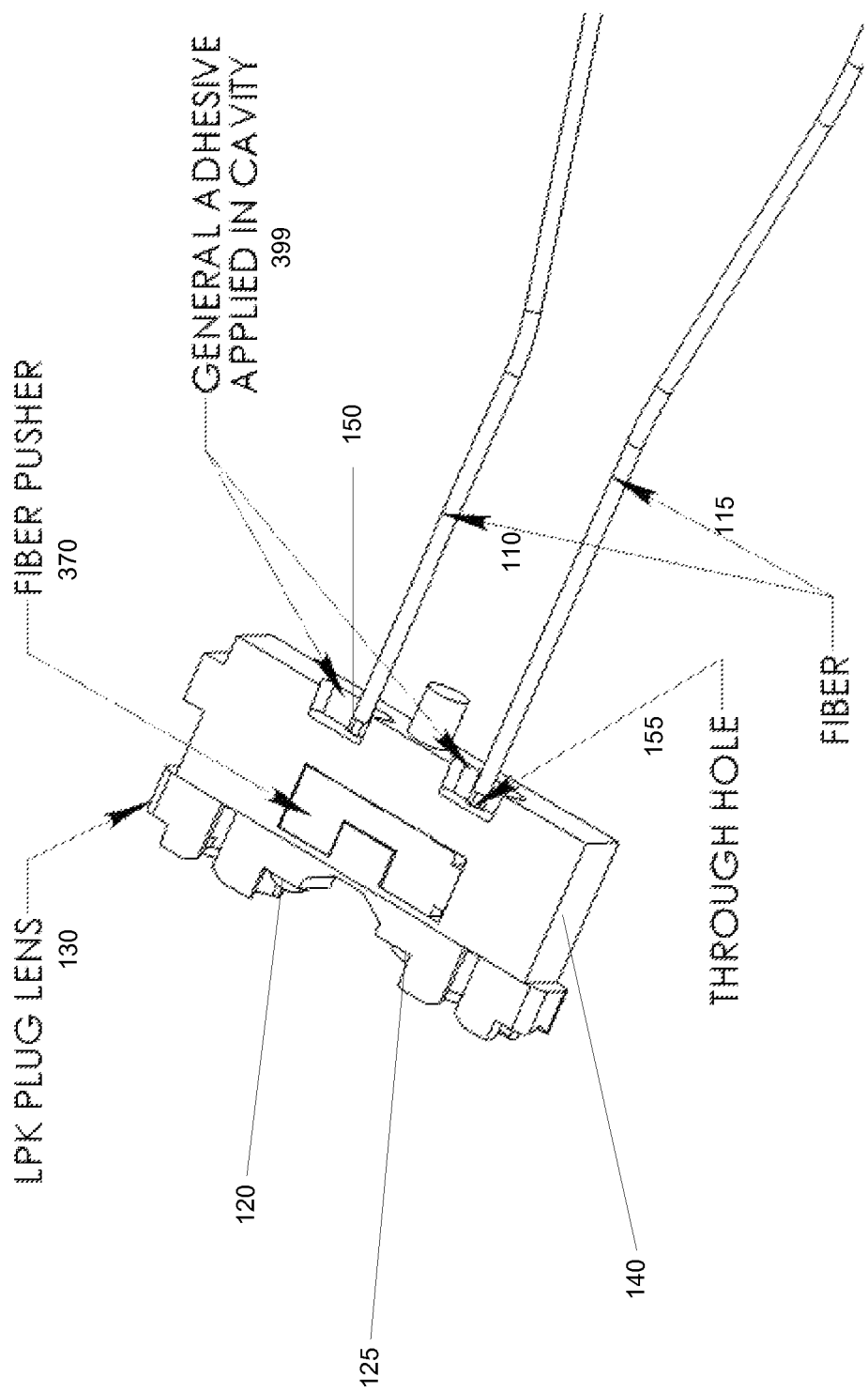
FIG. 3 is a block diagram of an embodiment of the invention.

FIG. 3 is a block diagram of an embodiment of the invention. In this example, fiber pusher 370 is molded to "press-fit" into cavity 190, and presses against fibers 110 and 115 in order to securely couple them to lenses 120 and 125, respectively. It is to be understood that having fiber pusher 370 molded to be "press-fit" into cavity 190 may eliminate the need for a general adhesive (e.g., general adhesive 289 as shown in FIG. 2) to be utilized in cavity 190. To further reinforce the coupling of fibers 110 and 115 to fiber termination unit 140, adhesive agent 399 may be placed at the opening of through holes 150 and 155 to securely fasten the fibers to the fiber termination unit. Adhesive agent 399 may be any adhesive suitable for bonding optical fiber to plastic/metal (e.g., glue, epoxy). It is to be understood that, in contrast to the prior art, adhesive 399 does not necessarily have to comprise a refractive index-matching adhesive, as through holes 150 and 155 are not responsible for coupling the ends of optical coupling of fibers 110 and 115 to lenses 120 and 125 (i.e., adhesive 399 does not have to reduce any potential optical loss).

Furthermore, fiber termination unit 140 utilizes the above described structural components in addition to adhesive 399 to ensure sustainable connection of optical fibers 110 and 115 to lenses 120 and 125 even after repeated insertion/removal of plug lens 130 into corresponding receptacles. This more reliable connection allows for various plug lens designs more suitable, for example, to smaller form factor computing devices.

Figure 4:
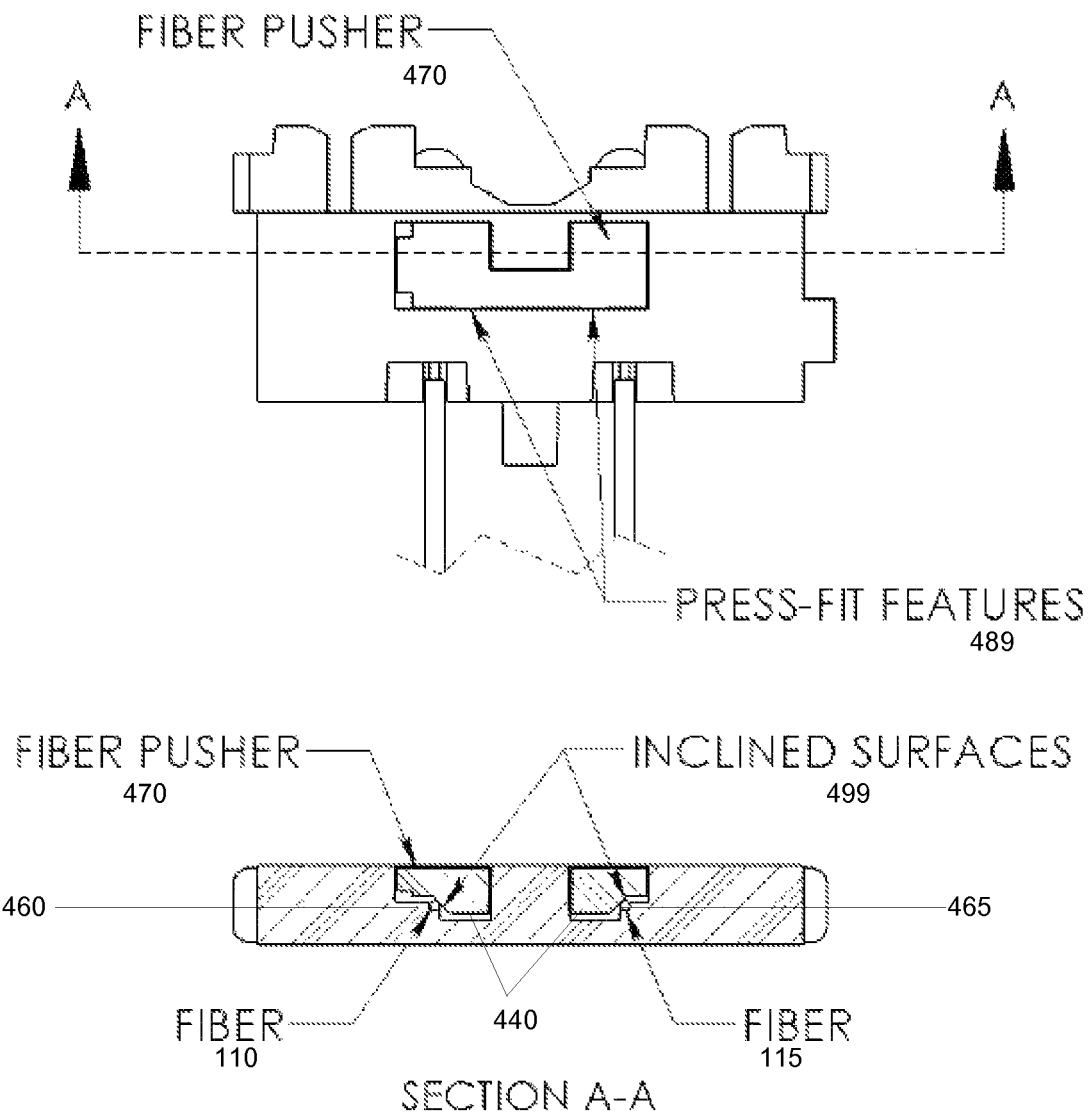
FIG. 4 is a block diagram and cross-section of an embodiment of the invention.

FIG. 4 is a block diagram and a cross section of an embodiment of the invention. At cross section A, it is shown that fibers 110 and 115 are securely positioned via fiber pusher 470 and grooves 460 and 465. In this embodiment, grooves 460 and 465 are shown to be "L-grooves;" thus, in this embodiment, fiber 110 is placed inside the "L" to contact both sides of groove 460. Fiber pusher 470, when press-fit into cavity 440 (via press-fit features 489), will press against fiber 110 to hold it between both sides of groove 460 as shown via inclined surfaces 499. It is understood that in other embodiments, other shaped grooves including at least two flat sides (e.g., "u-grooves," "v-grooves") and fiber pushers may be utilized to hold optical fiber in place to be optically aligned with a lens.

It is to be understood that, by keeping a more precise line of focus of the optical signal transfer between said optical fiber and said lenses, maintained optical alignment may reduce the adverse effects of dust or smudge lens contamination over the life of the optical cable device.

Besides computing devices, it will be understood that many other types of electronic devices may incorporate the one or more of the types of optical fiber connectors discussed above. Examples of other such electronic devices may include smartphones, tablet computers, media devices, multimedia devices, memory devices, storage devices, cameras, voice recorders, I/O devices, networking devices, gaming devices, gaming consoles, televisions or audio/visual (A/V) equipment, or any other electronic device that might include such a connector.

Connectors such as those described above may be used to interconnect peripheral devices (which may be, for example, any of the same types of devices discussed above) with a receiving (i.e., connector) port of a host device or system comprising a processor, a memory, antenna/RF circuitry and a system bus. Said system bus may receive said data from a peripheral device and make said data accessible to the processor and memory via the system bus. A receiving/connector port (i.e., plug) may be built directly into a peripheral device (with or without a cord), or may be interconnected to another device via a separate cable.

The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, the host device or system may include multiple physical antennas.

It is to be understood that said antenna and RF circuitry may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

It is noted that terms like "preferably," "commonly," and "typically" are not utilized above to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

The various assemblies described above could each also be referred to as a "subassembly." Technically, an assembly may refer to a "finished" product, or a finished system or subsystem of a manufactured item, while a subassembly generally is combined with other components or another subassembly to complete a subassembly. However, a subassembly is not distinguished from an 'assembly' herein, and use of the different terms is solely for convenience in description. Reference to an assembly may refer to what may otherwise be considered a subassembly.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention. Many modifications may be made to adapt the teachings of the present invention to a particular situation without departing from the scope thereof.

The invention claimed is:

1. An apparatus comprising:
   a lens;
   an optical fiber component;
   a fiber termination unit including
      a through hole,
      a cavity accessible via the through hole, and
      a groove included in the cavity, the groove comprising at least two flat sides; and
   a fiber pusher to at least partially fill the cavity and to couple the optical fiber component to the at least two flat sides of the groove;
   the optical fiber component to be optically aligned with the lens when coupled to the fiber pusher and the at least two flat sides of the groove.

2. The apparatus of claim 1, the cavity to at least partially be filled with a refractive index gel to at least partially fill space between the groove of the fiber termination unit and the fiber pusher.

3. The apparatus of claim 2, wherein the refractive index gel has a refractive index between 1.45 and 1.60.

4. The apparatus of claim 1, the fiber termination unit comprising a plastic material, the apparatus further comprising an adhesive suitable to bond the optical fiber component to the plastic material of the fiber termination unit at the through hole.

5. The apparatus of claim 1, where the groove of the fiber termination unit comprises an L-shaped groove.

6. The apparatus of claim 5, the fiber pusher to include an inclined surface to securely couple the optical fiber to the two sides of the L-shaped groove of the fiber termination unit.

7. The apparatus of claim 1, the fiber pusher further formed to be press-fit into the cavity of the fiber termination unit.

8. A method comprising:
   inserting an optical fiber component into a fiber termination unit via a through hole, the fiber termination unit coupled to a lens and further including
      a cavity accessible by the optical fiber via the through hole, and
      a groove included in the cavity, the groove comprising at least two flat sides
   a lens; and
   at least partially filing the cavity via a fiber pusher, the fiber pusher to couple the optical fiber component to the at least two flat sides of the groove, the optical fiber component to be optically aligned with the lens when coupled to the fiber pusher and the at least two flat sides of the groove.

9. The method of claim 8, further comprising at least partially filling the cavity with a refractive index gel to at least partially fill space between the groove of the fiber termination unit and the fiber pusher.

10. The method of claim 9, wherein the refractive index gel has a refractive index between 1.45 and 1.60.

11. The method of claim 8, the fiber termination unit comprising a plastic material, the method further comprising applying an adhesive suitable to bond the optical fiber component to the plastic material of the fiber termination unit at the through hole.

12. The method of claim 8, where the groove of the fiber termination unit comprises an L-shaped groove.

13. The method of claim 12, the fiber pusher to include an inclined surface to securely couple the optical fiber to the two sides of the L-shaped groove of the fiber termination unit.

14. The method of claim 8, the fiber pusher further formed to be press-fit into the cavity of the fiber termination unit.

15. A system comprising:
   a processor;
   a memory;
   a system bus operatively coupled to the processor and the memory; and a connection port to receive optical data and to make said data accessible to the processor and the memory via the system bus, the connection port capable of receiving an optical cable comprising
a lens,
an optical fiber component,
a fiber termination unit including
   a through hole,
   a cavity accessible via the through hole, and
   a groove included in the cavity, the groove comprising at least two flat sides, and
a fiber pusher to at least partially fill the cavity and to couple the optical fiber component to the at least two flat sides of the groove, the optical fiber component to be optically aligned with the lens when coupled to the fiber pusher and the at least two flat sides of the groove.

16. The system of claim 15, the cavity to at least partially be filled with a refractive index gel to at least partially fill space between the groove of the fiber termination unit and the fiber pusher, wherein the refractive index gel has a refractive index between 1.45 and 1.60.

17. The system of claim 15, where the groove of the fiber termination unit comprises an L-shaped groove.

18. The system of claim 17, the fiber pusher to include an inclined surface to securely couple the optical fiber to the two sides of the L-shaped groove of the fiber termination unit.

19. The system of claim 15, the fiber pusher further formed to be press-fit into the cavity of the fiber termination unit.

20. The system of claim 15, further comprising:
an antenna; and
radio frequency circuitry coupled to the antenna to receive signal data and to make said signal data accessible to the processor and the memory via the system bus.

* * * * *